3,352,835
POLYAMIDES FROM 3-AMINOMETHYL-3,5,5-TRI-
METHYL-1-CYCLOHEXYLAMINE AND A SEC-
OND DIAMINE AND PREPARATION THEREOF
Karl Schmitt, Herne, Westphalia, and Fritz Gude, Wanne-
Eickel, Germany, assignors, by mesne assignments, to
Scholven - Chemie Aktiengesellschaft, Gelsenkirchen-
Buer, Germany, a corporation of Germany
No Drawing. Filed Jan. 28, 1965, Ser. No. 429,207
Claims priority, application Germany, Jan. 30, 1964,
H 51,532
7 Claims. (Cl. 260—78)

This invention broadly relates to a method for improving the physical properties of polyamide resins. More specifically, this invention relates to a novel composition and method for modifying valuable physical properties of polyamide polymers.

Condensation polymers of 3 - (amino-methyl)-3,5,5-trimethylcyclohexylamine can be prepared with dicarboxylic acids, preferably adipic acid.

Polymers of this nature may be more conveniently used if other properties could be enhanced, such as flexibility, water-resistance, electrical resistance and the like could be modified. It is to these and other ends that the present invention is directed.

It is therefore an object of this invention to provide a novel composition having heat softening, surface hardness, water-clear, opaque, solubility, water-resistance, flexibility and electrical properties that may be readily varied, comprising polymers formed from 3-(amino-methyl) - 3,5,5 - trimethylcyclohexylamine and dicarboxylic acids.

It has been found that condensates which have a softening interval that is excellently suited for processing when in the state of fusion can be produced from 3-(amino-methyl) - 3,5,5 - trimethylcyclohexylamine and adipic acid if the 3 - (amino-methyl) - 3,5,5 - trimethylcyclohexylamine is partially preplaced during condensation by a diamine having the general formula $$H_2H—(CH_2)_x—NH_2 \quad (x=2-10)$$
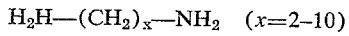

Thus, for example, hexamethylene diamine may be added in quantities of up to approximately 50 percent without affecting the glassy nature of the condensate. Even for quantities of more than 50 percent, for example 80 percent, distinct effects are still obtained, but in the latter case it is found that the softening point increases appreciably. At the same time it becomes evident that the more hexamethylene diamine is added within the aforesaid range, the greater will be the decrease in the softening point. While the non-modified product has a softening range of 220 to 240° C., a polycondensate having a softening point of 120 to 140° C. is obtained from the product modified according to the present invention, as for example by adding 50 percent of hexamethylene diamine. Surprisingly, it was found at the same time that the surface hardness of the product increases due to the addition of hexamethylene diamine. Thus, for example, for normal condensates without addition, a ball indentation hardness of 1100 to 1150 kgm. per sq. cm. is obtained, whereas for a product which has been modified with 10 percent of hexamethylene diamine a ball indentation hardness of 1250 to 1300 kgm. per sq. cm. is obtained.

A further improvement of the properties of products of this kind is attained if the adipic acid is completely or partially replaced by another dicarboxylic acid. For example, the monoalkylated, dialkylated or trialkylated form of adipic acid, further malonic acid, suberic acid, succinic acid, glutaric acid, pimelic acid, azelaic acid, sebacic acid, maleic acid, furmaric or the like may be used as such a dicarboxylic acid. Examples of acids having an aromatic or hydroaromatic structure are phthalic acid, isophthalic acid, terephthalic acid, their hydrogenation products, phenylene dipropionic acid, phenylene diacetic acid, etc. Ketocarboxylic acids and the corresponding thio compounds may also be used. The addition of small quantities of polyfunctional compounds, as for example methylene diadipic acid, may have a favourable effect on the decrease in sensitivity to water( break due to water). Of course, mixtures of these acids are also applicable.

All the polyamides which, according to this invention can be produced by combining diamine with dicarboxylic acid can form not only transparent, water-white materials but also opaque materials by use of the same reactants.

By mixing several dicarboxylic acids, the properties of the final products can be greatly modified in the desired direction.

Insofar as the application to the field of plastics is concerned, according to the prior art, dicarboxylic acids cannot be used as reactants for the production of high-molecular polyamide below a chain length of 6 C atoms since the tendency to form relatively low-molecular ring compounds is preponderant.

However, according also to the prior art other dicarboxlic acids which for steric reasons can be condensed to high-molecular substances only with difficulty, as for example o-phthalic acid and trimethyl adipic acids, are less suitable for the production of high-molecular plastics.

However, all the dicarboxylic acids, polycondensed with 3 - (amino-methyl) - 3,5,5 - trimethyl-cyclohexylamine with the addition of straight-chain diamines having 2 to 10 $CH_2$ groups between the amino groups, can be applied in the field of varnishes, cast films, impregnating agents and the like if the solubility in solvents, as for example gasolines, aromatic substances, hydroaromatic substances, ester, terpenes, alcohols or halogen hydrocarbons, etc., is assured.

Low-molecular polyamides are more soluble than high-molecular ones. Branching of the hydrocarbon chain, for example in the case of alkylated adipic acids and unsaturates dicarboxylic acids (e.g. maleic acid and fumaric acid), results in an improvement in the solubility of the molecule, and sometimes even in an alcohol solubility, which is very important for special purposes.

Dicarboxylic acids, which on account of their structure and the length of their hydrocarbon chains, have the prerequisites of being capable of condensation to high-molecular plastics (molecular weight approximately above 7–8000) with the diamine combination, according to this invention, exhibit a number of properties which are controllable and which are particularly interesting for technical application by variation of the acid components, in this case also. Thus, by the introduction of alkyl side groups, for example by condensation with the use of methyl adipic acid, the elasticity of the products is increased but the hardness is decreased. However, the application of aromatic acids frequently results in plastics which are more brittle but which have more resistance to heat. The use of long-chain dicarboxylic acids, for example suberic acid, azelaic acid, sebacic acid, etc., brings about a lower water absorption of the condensate. This makes it possible to use products of this kind in the electrical industry. As the hydrocarbon chains in the components are lengthened, the range of fusion and thus also the heat resistance of the articles produced therefrom, decreases. However, the melt viscosity decreases, which has a favourable effect on the processing.

Condensation according to the present invention may be carried out without solvents, or with solvents, as for example aromatic, aliphatic, alicyclic hydrocarbons or even water; and if required, with the addition of the usual stabilizers or chain breakers, as for example carboxylic acids or monofunctional amines.

It is possible to start with the salts of the reactants as well as with such pure substances as are capable of condensation, without isolation of their salts. However, instead of starting with the free dicarboxylic acids esters, half-esters, acid halides or amides, it is also possible to start with other compounds of the acids which change to polyamides while splitting off compounds that can be easily removed from the reaction mixture. The condensation temperatures which are usually applied lie approximately within the range of 150 to 300° C. In the present case, condensation is carried out in such a way that the salt mixture is heated above the fusion temperature for several hours with reflux. Following this precondensation stage, a vaccum is applied while the temperature is permitted to increase continuously possibly after the increase of the melt viscosity.

The following non-limiting examples are given as certain preferred embodiments of the invention and are not to be construed as narrowing the novel and inventive composition and method of the applicants.

Examples

The examples below serve to illustrate the present invention.

The reduced specific viscosity ($\eta$ red) which was obtained as a 1% solution in pure formic acid at 20° C. is used as the criterion of the molecular weight of the polyamides. The mixtures of the salts or dicarboxylic acids and of the diamines, which are listed in the table, were heated in a glass flask in the presence of nitrogen for three hours at 220–270° C. under reflux. The polycondensation was terminated subsequently at approximately 250–270° C. while applying a vacuum of 14 mm. Hg for 8 hours.

In the examples, the reduced specific viscosity $\eta$ red is given as an indication of the molecular weight and is determined on the basis of a 1% solution in pure formic acid at 20° C. The ball hardness is determined according to DIN 57,302 (German Industrial Standards) using in that connection a ball diameter of 5 mm. and a test load of 50 kg. The first value to be observed (0 second) is given as ball pressure hardness in the examples. The softening range is determined by placing a sample of condensation product having a size of about that of a pin-head between two cover glasses of a heating table microscope having a 100-fold enlargement. The sample is heated up to about 20° C. under the assumed softening start and thereafter, while under continuous observation from the microscope ocular, the heating table is subjected to temperature increase of about 1–2° C./min. The lower value of the softening range is taken as the first visible recognition of melt formation, and the upper value is established as the point at which complete liquefaction of the test sample occurs.

The abbreviations in the table have the following meaning:

Cyclic diamine=3 - (amino-methyl)-3,5,5-trimethyl-1-cyclohexylamine
TMA=$\alpha,\alpha',\gamma$-trimethyladipic acid
Adip.=Adipic acid
MMA=$\beta$-methyladipic acid
Sebac.=Sebacic acid
Tereph.=Terephthalic acid
Succ.=Succinic acid

| Salt I | | Salt II | | $\eta$ red | Ball indentation hardness, kgm./sq. cm. | Softening point, °C. | Appearance |
|---|---|---|---|---|---|---|---|
| Percent by weight | Type | Percent by weight | Type | | | | |
| 100 | Adip. ring diamine | | Adip. hexamethylene diamine | 1.72 | 1,129 | 221–239 | |
| 90 | do | 10 | do | 0.96 | 1,273 | 179–217 | |
| 70 | do | 30 | do | 1.44 | 1,253 | 180–212 | |
| 50 | do | 50 | do | 1.41 | 1,198 | 116–149 | |
| 35 | do | 65 | do | 1.37 | 1,137 | 228–233 | |
| 20 | MMA ring diamine | 80 | Adip. hexamethylene diamine | 3.7 | 1,160 | 222–234 | Opaque. |
| 70 | TMA ring diamine | 30 | Tereph. hexamethylene diamine | 0.4 | | 176–192 | Clear, brittle. |
| 70 | Sebac. ring diamine | 30 | Sebac. hexamethylene diamine | 1.2 | 1,040 | 130–153 | Clear. |
| 50 | Sebac. and cyclic diamine | 50 | Succ. and hexamethylene-diamine | 0.12 | | 45–105 | Opaque, brittle. |

Mol ratio of diamines to dicarboxylic acids in the salts is 1:1.

What we claim is:

1. A polyamide of a mixture consisting essentially of a first amine comprising 3-(amino-methyl)-3,5,5-trimethyl-1-cyclohexylamine and a second amine of the formula $$H_2N-(CH_2)_x-NH_2$$

where $x$=2–10 with a dicarboxylic acid.

2. The polyamide according to claim 1, where said second amine comprises hexamethylenediamine.

3. The polyamide according to claim 1, where said dicarboxylic acid comprises adipic acid.

4. The polyamide according to claim 1, where said dicarboxylic acid comprises alkylated adipic acid.

5. The polyamide according to claim 1, where said dicarboxylic acid comprises trimethyl adipic acid.

6. The polyamide according to claim 1, where said dicarboxylic acid is selected from at least one member of the group consisting of sebacic acid, malonic acid, succinic acid, glutaric acid, pimelic acid, azelaic acid, maleic acid, fumaric acid, phthalic acid, isophthalic acid, terephthalic acid, hydrogenated phthalic acid, hydrogenated isophthalic acid, hydrogenated terephthalic acid, phenylenedipropionic acid, and phenylenediacetic acid.

7. A composition of matter consisting essentially of the polyamide of claim 1 and a solvent therefor the polyamide being dissolved in said solvent.

References Cited

UNITED STATES PATENTS 2,130,948  9/1938  Carothers 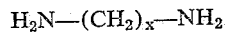 260—78

WILLIAM H. SHORT, *Primary Examiner.*
SAMUEL H. BLECH, *Examiner.*
H. D. ANDERSON, *Assistant Examiner.*